United States Patent [19]

Cigarini et al.

[11] Patent Number: 5,237,142
[45] Date of Patent: Aug. 17, 1993

[54] METHOD AND DEVICE FOR DETERMINING THE WEIGHT OF A FOOD CONTAINED IN A MICROWAVE OVEN

[75] Inventors: Enzo Cigarini, Brebbia; Claudio Civanelli, Travedona; Mario Fioroli, Brezzo di Bedero, all of Italy

[73] Assignee: Whirlpool International B.V., Veldhoven, Netherlands

[21] Appl. No.: 647,384

[22] Filed: Jan. 29, 1991

[30] Foreign Application Priority Data

Feb. 1, 1990 [IT] Italy .............................. 19216 A/90

[51] Int. Cl.⁵ ............................................. H05B 6/68
[52] U.S. Cl. ..................... 219/10.55 M; 219/10.55 B; 219/10.55 A; 219/10.55 R; 219/10.55 F; 99/325; 99/451; 374/149
[58] Field of Search ................. 219/10.55 M, 10.55 R, 219/10.55 F, 10.55 B, 10.55 A; 374/30, 121, 149; 99/451, 325

[56] References Cited

U.S. PATENT DOCUMENTS

| | | | |
|---|---|---|---|
| 3,560,735 | 2/1971 | Strange | 250/43.5 |
| 3,671,404 | 6/1972 | Meckler | 202/176 |
| 3,801,284 | 4/1974 | Meckler | 23/263 |
| 4,341,937 | 7/1982 | Staats | 219/10.55 R |
| 4,520,250 | 5/1985 | Ishihara et al. | 219/10.55 B |
| 4,859,078 | 8/1989 | Bowman et al. | 374/44 |
| 4,870,235 | 9/1989 | Steers et al. | 219/10.55 B |
| 4,871,891 | 10/1989 | Steers et al. | 219/10.55 B |
| 4,906,105 | 3/1990 | Geake | 374/30 |
| 4,970,374 | 11/1990 | Ueda et al. | 219/10.55 B |
| 4,998,001 | 3/1991 | Cigarini et al. | 219/10.55 M |
| 5,036,172 | 7/1991 | Kokkeler et al. | 219/10.55 M |

Primary Examiner—Bruce A. Reynolds
Assistant Examiner—Tu Hoang
Attorney, Agent, or Firm—Thomas J. Roth; Stephen D. Krefman; Thomas E. Turcotte

[57] ABSTRACT

A method and apparatus for determining the weight of foods contained in a microwave oven and for controlling their treatment in accordance with that weight. The apparatus determines the weight by measuring the heating of a body of microwave-sensitive material disposed in the chamber and not shielded by the food during a stage of operation of the magnetron at a predetermined power for a predetermined time, wherein the heating of the body disposed in the cooking chamber is measured. Thereafter, cold is administered to the body so as to return its temperature to a constant value and maintain it thereat until another weight determination is to be made. The method is implemented by an apparatus including a body constructed of microwave-sensitive material positioned on a wall of the cooking chamber, a temperature sensor for sensing the rise in temperature of the material when exposed to microwave energy, and a cold generator for returning the temperature of the material to a constant temperature.

4 Claims, 1 Drawing Sheet

METHOD AND DEVICE FOR DETERMINING THE WEIGHT OF A FOOD CONTAINED IN A MICROWAVE OVEN

FIELD OF THE INVENTION

This invention relates to a method and device for determining the weight of a food contained in a microwave oven having a cooking chamber and a microwave generator or magnetron, in order to control the magnetron operating power and time for the treatment of the food.

BACKGROUND OF THE INVENTION

In general in a microwave oven provided with a microprocessor controlling the operation of the magnetron, the food treatment (thawing, thawing plus heating, or thawing plus cooking) can be preplanned by the user by setting the food weight, the food type and the required type of treatment. These data enable the microprocessor to control the magnetron operation at the power and for the time required to obtain the desired treatment.

To be able to operate automatically on the magnetron so as to fix its operating power and control the food treatment without the weight of the food having to be keyed in manually by the user, this weight is determined for example by placing the food on a support to which a weight measurement device or more simply balance is connected. The balance thus enables the food weight to be automatically fed to the microprocessor by merely placing the food in the oven.

Such a system is much used. It has however many drawbacks including the high cost of the components and the fact that the weighing device is a very sensitive and delicate mechanism which means that it can be easily damaged during the insertion of the food into the oven and/or during the oven operation.

Alternatively, to automatically control the treatment of a food in a microwave oven (for example its thawing), weight sensors are provided in the oven to measure the variation in the weight of the food as said operation proceeds. These sensors are connected to the microprocessor which, on the basis of a preset program and the data obtained by the sensor, halts the operation of the microwave generator and thus the thawing when the weight of the food has reached a predetermined value.

As an alternative to the aforesaid there are microwave ovens provided with infrared sensors which measure the surface temperature of the food. These sensors, connected to a microprocessor, cause the control member to act on the microwave generator and halt its operation when the food surface temperature has reached a predetermined value.

In both cases a microwave oven as described is costly and laborious to construct. In addition the data obtained by the sensors do not always reflect the true thawing level attained by the food, particularly with regard to its interior.

To determine the weight of a food contained in the microwave oven and on this basis set the operation of the magnetron and control the treatment of the food, it is known to measure the quantity of water contained in it when the food is frozen or is in any event at low temperature. This forms the subject of preceding patent applications in the name of the present applicant, which claim the use of bodies constructed of microwave-sensitive material disposed below the food in appropriate cavities provided in the oven casing. These bodies absorb the microwaves generated by the magnetron to a different extent depending on the free water contained in the food and on the temperature of this latter. The greater the quantity of free water present in the food the smaller the amount of microwaves which reach the body lying below it, and the less the body heats up.

As the percentage of water in foods is proportional to the weight of the food itself for each food type, the food weight can be determined by indirectly measuring this quantity of free water. To obtain this measurement, the bodies are associated with probes which measure their temperature and feed the measured data to the usual microprocessor which by knowing the quantity of free water present in the food, can use this information to obtain its weight, set the operation of the magnetron and control the treatment of the food.

In this respect it has been surprisingly found that the heating curve of such bodies of microwave-sensitive material becomes, within a small time period from application of the microwaves, a straight line for temperature/time, the slope of which varies according to the food weight.

It is apparent that if at the end of this time period T a measurement is made either of the slope of this straight line or the point of intersection with the temperature axis of a straight line parallel to the time axis and passing through the point which the temperature/time line has reached after the time period t, the microprocessor receives information corresponding to the food weight and, on the basis of this and taking into account the information fed in by the user regarding the food type and the required treatment, is able to fix the operating power of the magnetron and the duration and mode of treatment.

Although such a solution enables satisfactory results to be obtained, it is of complicated construction particularly with regard to the formation of the seats for the microwave-sensitive bodies or elements and the seats for the probes. In addition, as the heating of the elements depends on the degree to which the foods positioned above them are transparent to the microwaves, any mistake in positioning the foods in the cooking chamber falsifies the data received by the microprocessor and thus falsifies its action on the magnetron and its control over the food treatment. In addition, once the microwave-sensitive elements have become hot it is not possible to reuse them for determining the weight of another food to be treated until they have cooled down, otherwise the weight determination is inaccurate.

SUMMARY OF THE INVENTION

An object of the present invention is therefore to provide a microwave oven and a method by which the weight of a food to be treated can be determined, to thus enable the control of food treatment to be improved compared with that obtainable in ovens of the known art.

A further object is to provide an oven of the aforesaid type in which the magnetron and food treatment control can be effected in a simpler manner than with known ovens.

A further object is to provide a microwave oven in which the magnetron and food treatment control is effected in an efficient, safe and reliable manner, and in which this control can be effected during successive periods of oven operation without having to wait for the microwave-sensitive element to cool.

These and further objects which will be apparent to the expert of the art are attained by a method for determining the weight of a food contained in a microwave oven in order to control the magnetron operating power and time for the treatment of the food, the oven comprising a cooking chamber and a microwave generator or magnetron, characterised in that the determination of the weight is made by measuring the heating of a body of microwave-sensitive material disposed in the chamber in a position not screened by the food, during a stage of operation of the magnetron at a predetermined power for a predetermined time, and administering a cold to the body such as to return its temperature to a constant value and maintain it thereat.

The method is implemented by a device characterised by comprising a body constructed of microwave-sensitive material disposed, in a position not screened by the food, at any point on a wall of the cooking chamber, with the body there being associated temperature sensing means and cooling means connected to a microprocessor circuit which, based on the measurement of the heating of the body, enables the cooling means to administer cold to the body in order to cool it and maintain it at constant temperature.

BRIEF DESCRIPTION OF THE DRAWINGS

The present invention will be more apparent from the accompanying drawing, which is provided by way of non-limiting example and in which.

DETAILED DESCRIPTION OF A PREFERRED EMBODIMENT OF THE INVENTION

Figure 1:
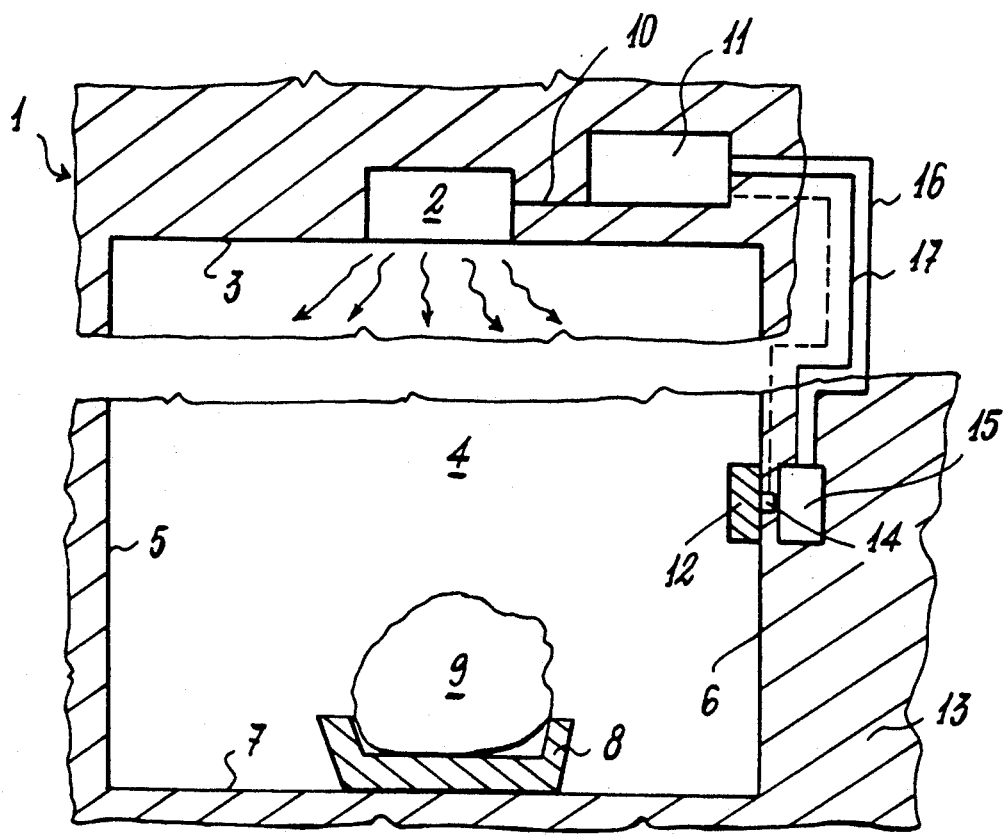
FIG. 1 is a partial schematic cross-section through a microwave oven constructed in accordance with the invention.

With reference to FIG. 1, a microwave oven indicated overall by 1 comprises a microwave generator or magnetron 2 disposed in the roof 3 of a cooking chamber 4 having side walls 5 and 6 and a bottom wall or base 7.

A support plate 8, for example of ceramic, terracotta or the like for a food 9, rests on the base 7. The magnetron 2 is operated via an electric line 10 by a usual microprocessor circuit 11 which, via the line, varies the power of the microwave generator as required.

According to the invention, on any wall (in the example the side wall 6) of the cooking chamber 4 there is positioned a body 12 of known microwave-sensitive material. Advantageously the body (which is not screened by the food 9) is formed by depositing a layer of microwave-sensitive coating of suitable thickness on the wall 6. Within the structure 13 of the oven 1 in a position corresponding with the body 12 there are disposed a temperature sensor 14 and a cold generating means 15. This latter is advantageously a known cell of Peltier effect connected to a electrical supply circuit comprising electrical lines 16 and 17 and controlled by the microprocessor circuit 11.

The method of the invention will now be described within the context of the description of operation of the oven shown in FIG. 1.

It will be assured that the food 9, for example meat, positioned on the plate 8 is to be thawed and cooked. To achieve this the magnetron 2 is initially switched on in known manner by the user, for example by means of a pushbutton positioned on the face of the oven 1. The user then sets the type of food (in this case meat) and the type of treatment (thawing and cooking). Operating the pushbutton causes the microprocessor 11 to operate the magnetron 2 at a certain constant power (for example half power) known hereinafter as the test power, for a short time period t, for example 10-15 seconds, known hereinafter as the test period. On operating the magnetron 2 only a fraction of the microwaves 100 are absorbed by the frozen food, whereas most are absorbed by the body 12, which consequently heats up. This heating is sensed by the temperature sensor which is advantageously a known resistor of negative temperature coefficient (or ntc sensor). At this point the microprocessor, on the basic of the measured temperature information, powers the Peltier cell 15 via the electrical lines 16 and 17, the cell in known manner absorbing energy from the body 12 to cool it (i.e. it transfers cold to the body). The hotter the body 12 the greater the electrical energy which has to be fed to the cell 15 to enable this to transfer cold to the body.

Figure 2:
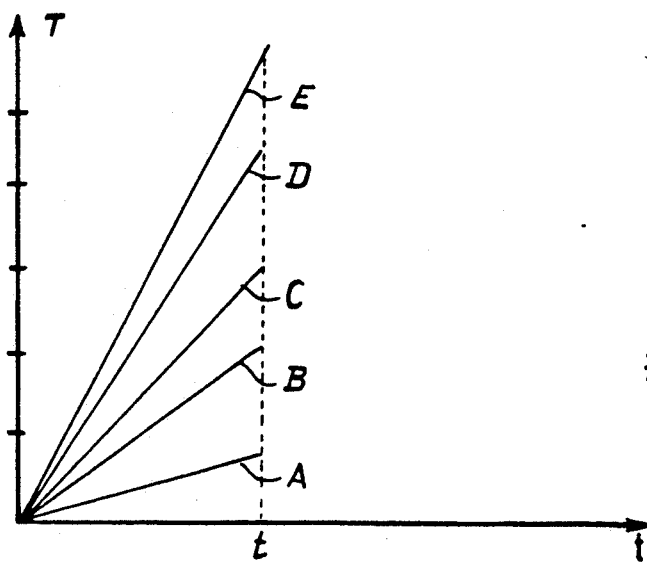
FIG. 2 is a time-temperature curve showing the variation in temperature of a microwave-sensitive body used in the oven according to the invention, during the presence of foods of different weight or of different foods of equal weight.

More specifically, it has been surprisingly discovered experimentally that the rate at which the temperature of the body 12 varies is related to the weight of the food contained in the cooking chamber 4 of the oven 1. This relationship between the weight of the food 9 and the rate of heating of the body 12 is shown in FIG. 2 by the various curves or straight lines present in this figure and their different slopes, these slopes representing the rate of heating of the body 12, or by the different points of intersection with the temperature axis of a straight line parallel to the time axis which passes through the points on the curves at the end of the test period t. Groups of straight lines similar to those of FIG. 2 are also obtained for the same food but of varying weight.

As stated, these curves (or data relating to the rate of heating of the body 12) were obtained experimentally by subjecting the body to the microwaves generated by a magnetron operating at the test power for a time equal to the test period. The data were obtained by positioning the body 12 in a microwave oven in the presence of frozen foods of different weight and type (such as meat, fish, vegetables, pulses and cereals), the body not being screened by the foods. Thus, depending on the weight of the food 9, the body 12 heats up in accordance with one of the curves A, B, C, D or E. On the basis of this, the microprocessor (the memory of which already contains the curves) is able to determine the weight of the food and to feed an exact quantity of energy to the Peltier cell 15 for cooling the body 12.

Based on the evaluation of the weight of the food 9 and the data fed to the microprocessor by the user regarding the type of food and the type of treatment chosen, the microprocessor sets and controls the operation of the magnetron 2 to enable the food 9 to be treated as desired by the user.

Specifically, the parameters on which the microprocessor operates are the magnetron operating power, the duration of treatment and the power applied during this type of treatment, which can be constant or variable according to suitable criteria in optimising the cooking result.

With the aforesaid method the body 12 is maintained continuously at substantially constant temperature. This enables the oven to be used repeatedly without any waiting, for treating different foods with control of the magnetron power and of the treatment itself by the microprocessor circuit on the basic of the weight of each food placed in the cooking chamber 4. This control is always accurate for each treatment and is not influenced by the conditions of the treatment which has previously been carried out. The method offered by the invention is very practical. In addition the device of the invention is simpler to construct than analogous devices of the state of the art, and in addition gives excellent results with high reliability.

We claim:

1. A method for determining a weight for food contained in a microwave oven having a cooking chamber and a microwave generator having a controllable operating power for heating the food and for heating a body of microwave-sensitive material to a temperature dependent on the weight of the food in order to control the microwave generator operating power and time to treat said food, characterized in that said determining a weight is made by measuring the temperature of said body disposed in said chamber in a position not screened by the food, during a stage of operation of the microwave generator at a predetermined power for a predetermined time, and thereafter administering cooling to said body to return its temperature to a constant value and maintain it thereat.

2. A device for controlling a treatment of food contained in a microwave oven based on determining a weight for said food comprising a cooking chamber and a microwave generator for heating the food, a body constructed of microwave-sensitive material disposed, in a position not shielded by the food, at a point on a wall of the cooking chamber, with said body there being associated temperature sensing means and cooling means electrically connected to a microprocessor circuit to control said generator to operate at a selected power for a period of time, and which, thereafter, based on a measurement of the heating of said body by said sensing means, enables the cooling means to administer a cooling to said body in order to cool it and maintain it at constant temperature.

3. A device as claimed in claim 2, characterized in that the temperature sensing means is a resistor of negative temperature coefficient.

4. A device as claimed in claim 2 characterized in that the cooling means is a cell based on the Peltier effect.

* * * * *